(12) United States Patent
Hamiti et al.

(10) Patent No.: US 7,333,825 B2
(45) Date of Patent: Feb. 19, 2008

(54) APPARATUS, AND ASSOCIATED METHOD, FOR FACILITATING COMMUNICATION RESOURCE ALLOCATION IN A PACKET RADIO COMMUNICATION SYSTEM

(75) Inventors: Shkumbin Hamiti, Espoo (FI); Guillaume Sebire, Helsinki (FI); Iuliana Virtej, Espoo (FI)

(73) Assignee: Nokia Corporation, Espoo (FI)

( * ) Notice: Subject to any disclaimer, the term of this patent is extended or adjusted under 35 U.S.C. 154(b) by 358 days.

(21) Appl. No.: 10/135,810

(22) Filed: Apr. 30, 2002

(65) Prior Publication Data

US 2003/0078059 A1 Apr. 24, 2003

Related U.S. Application Data

(60) Provisional application No. 60/329,838, filed on Oct. 17, 2001.

(51) Int. Cl.
*H04B 7/00* (2006.01)
(52) U.S. Cl. .................... 455/515; 455/464; 455/466; 455/450
(58) Field of Classification Search .............. 370/60.1, 370/95.1, 95.3, 110.1, 329, 352; 379/63; 455/57.1, 54.2, 452.1, 452.2, 450, 466
See application file for complete search history.

(56) References Cited

U.S. PATENT DOCUMENTS

| | | | |
|---|---|---|---|
| 5,502,721 A * | 3/1996 | Pohjakallio | 370/336 |
| 6,047,189 A | 4/2000 | Yun et al. | |
| 6,438,114 B1 * | 8/2002 | Womack et al. | 370/329 |
| 6,477,160 B2 | 11/2002 | Gleeson | |
| 6,701,151 B2 * | 3/2004 | Diachina et al. | 455/452.1 |
| 6,714,794 B1 * | 3/2004 | O'Carroll | 455/466 |
| 2002/0065081 A1 * | 5/2002 | Barany et al. | 455/450 |
| 2002/0191591 A1 * | 12/2002 | Kivijarvi et al. | 370/352 |

* cited by examiner

*Primary Examiner*—Duc M. Nguyen
*Assistant Examiner*—Wayne Cai
(74) *Attorney, Agent, or Firm*—Foley and Lardner LLP

(57) ABSTRACT

Apparatus, and an associated method, for facilitating assignment of a dedicated channel upon which to communicate packet-formatted data in a packet communication system. A channel allocation request message generator positioned at a mobile station generates a packet channel request while the mobile station is camped-on a packet data control channel. And, a channel allocation signal message generator, upon detection of the request, selectably generates a channel allocation through the packet data control channel.

20 Claims, 3 Drawing Sheets

APPARATUS, AND ASSOCIATED METHOD, FOR FACILITATING COMMUNICATION RESOURCE ALLOCATION IN A PACKET RADIO COMMUNICATION SYSTEM

CROSS-REFERENCE TO RELATED APPLICATION

The present application claims the benefit of provisional patent application of Application Ser. No. 60/329,838, filed on Oct. 17, 2001.

The present invention relates generally to a manner by which to facilitate allocation of communication resources to effectuate a packet communication service in a packet radio communication system, such as a GSM (Global System for Mobile communications) communication system that provides for GPRS (General Packet Radio Service).

More particularly, the present invention relates to apparatus, and an associated method, by which to initiate, from a mobile station, a request for allocation of a dedicated channel (e.g. SDCCH (Stand-alone Dedicated Control Channel)), upon which to communicate packet-formatted data to effectuate the communication service. The request is generated without requiring the mobile station to tune to the CCCH (common control channel) to generate the request, hence reducing the risk for CCCH congestion. Instead, the request is generated, e.g., while the mobile station is tuned to the PCCCH (packet common control channel). Quicker and more efficient allocation of communication resources is thereby permitted.

BACKGROUND OF THE INVENTION

A communication system operates to communicate data between two, or more, locations. Communication stations of the communication system are positioned at the separate locations, and the data is communicated therebetween. At a minimum, a first of the communication stations forms a sending station, and a second of the communication stations forms a receiving station. Data is communicated upon a communication channel that is formed to interconnect the communication stations positioned at the separate locations.

The development, and implementation, of new types of communication systems have been made possible as a result of advancements in communication technologies. For instance, new types of radio communication systems have been made possible as a result of the advancements in communication technologies.

In a radio communication system, the communication channel upon which data is communicated is defined upon a radio link extending between the communication stations. Because a radio link is utilized to form the communication channel, a wireline connection is not required to interconnect the communication stations. Communications by way of a radio communication system are therefore advantageous when the use of a wireline connection would be inconvenient or impractical. And, most mobile communication systems are radio communication systems as the need for the wireline connection is obviated, thereby providing the capability of the communication stations operable therein to be mobile. And, infrastructure costs associated with a radio communication system are generally less than the corresponding infrastructure costs associated with a wireline communication system as the need to install fixed connections between the sending and the receiving stations are obviated.

A cellular communication system is a type of radio communication system and is exemplary of a radio communication system that has been made possible due to advancements in communication technologies. Telephonic communication of data is provided through the use of a cellular communication system. Portable radio transceivers, referred to as mobile stations, are used by subscribers to a cellular communication system. A mobile station is utilized generally in a manner analogous to the manner by which a conventional, telephonic station is utilized.

Various types of cellular communication systems have been implemented, utilizing various communication schemes. First-generation, cellular communication systems utilize analog communication schemes while subsequent generation communication systems have generally utilized digital communication schemes. Digital communication schemes permit improved efficiency of limited available bandwidth within which radio links are formable upon which communication channels can be defined.

One such digital communication scheme is a GSM (Global System for Mobile communications) communication scheme. New implementations of communication systems utilizing the GSM communication scheme also provide for GPRS (General Packet Radio Service). GPRS for GSM permits packet communication services to be effectuated utilizing packet-switched connections.

Signaling protocols have been set forth by which to allocate communication resources to effectuate a GPRS communication service. Request for resources is made by the mobile station. Resources are requested responsive to a mobile-originated communication or responsive to a mobile-terminated communication.

In today's GPRS, or generally in A/Gb mode of operation, prior to the request for allocation of communication resources, the GPRS capable mobile station "camps" in an RR idle mode/packet idle mode on a CCCH (Common Control Channel) when a fifty-one-multiframe GSM implementation is followed and no PCCCH is provided in the cell. When the system is GPRS capable, a fifty-two-multiframe GSM scheme is followed in packet idle mode, provided that a PCCCH (Packet Common Control Channel) is provided in the cell. The GPRS capable mobile station camps on the PCCCH. Besides, for Iu mode, a cell supporting Iu mode must support the PCCCH. An Iu capable MS operating in Iu mode in such a cell camps on PCCCH.

In A/Gb mode of operation, when the fifty-two-multiframe scheme is followed and the mobile station camps on the PCCCH, if the mobile station is paged for an RR connection establishment (i.e. circuit-switched services), such as by a page generated on a packet paging channel (PPCH), the mobile station must stop monitoring the PCCCH and, instead, tune to the common control channel CCCH. Once the mobile station is tuned to the CCCH, the mobile station may request, by way of a random access upon a random access channel (RACH), allocation of a SDCCH (Stand-alone Dedicated Control Channel). Responsive to the request, a channel assignment is assigned by way of an access grant channel (AGCH). A corresponding procedure is required when a mobile-originated voice call is initiated. That is to say, when the mobile station is camping on a PCCCH and a spontaneous request is to be generated, i.e., the mobile-originated voice call is to be effectuated, the mobile station retunes to the CCCH. Once tuned to the CCCH, the mobile station requests an SDCCH by way of the random access channel.

The existing need for the mobile station to move from the PCCCH to the CCCH not only increases the risk of CCCH congestion, but also increases the delay to the allocation of the channel and corresponding effectuation of the communication service.

If a manner could be provided by which to permit the mobile station to request the channel allocation without first moving from the packet common control channel to the common control channel, improved efficiencies of communications would be provided.

It is in light of this background information related to communications in a packet radio communication system that the significant improvements of the present invention have evolved.

SUMMARY OF THE INVENTION

The present invention, accordingly, advantageously provides apparatus, and an associated method, by which to facilitate allocation of communication resources to effectuate a packet communication service in a packet radio communication system, such as a GSM (Global System for Mobile communications) that provides for GPRS (General Packet Radio Service).

Through operation of an embodiment of the present invention, a manner is provided by which to initiate, from a mobile station, a request for allocation of a dedicated channel (e.g. SDCCH (Stand-alone Dedicated Control Channel)), upon which to communicate packet-formatted data to effectuate a communication service.

The request is generated without requiring the mobile station to tune to the CCCH (common control channel )to generate the request, hence reducing the risk for CCCH congestion. Instead, requests for the allocation of the communication resources is made while the mobile station is camped on, i.e., tuned to, the PCCCH (packet common control channel). Quicker, and more efficient, allocation of communication resources is thereby permitted.

Through further operation of the present invention, a grant of the allocation of the communication resources by the assignation of a dedicated channel (e.g. stand-alone dedicated control channel (SDCCH)) is communicated to the mobile station that generated the request. The grant is communicated to the mobile station in the form of an assignment message, a packet DBPSCH assignment. The message is communicated upon a PAGCH (Packet Access Grant Channel).

In one aspect of the present invention, the request generated by the mobile station upon the PCCCH is of a multi-bit value. The multi-bit value forming the request is of an eleven bit-length in which the access request, of an SRB configuration, is of a bit-length of six bits and remaining bits of the request message, i.e., the remaining five bits are of random values. In another implementation, the request message is of an eight-bit length. Five of the bits, in an SRB configuration, define the access request, and the remaining bits, three bits, are of random values.

In another aspect of the present invention, a mobile station is operable alternately in an Iu-mode and an A/Gb mode, or in Iu mode only, or in A/Gb mode only. In one implementation, the dedicated channel request message is common to both of the modes of operation. In another implementation, the dedicated channel request message message is applicable to Iu mode of operation only. And, in yet another implementation, the values of the dedicated channel request message are of first values for Iu-mode of operation (hence indicative of an In mode access) and of second values for A/Gb mode of operation (hence indicative of an A/Gb mode access).

In another aspect of the present invention, a signaling radio bearer access request is generated when the mobile station is operated in the Iu-mode. Responsive to an SRB access request, allocation of a dedicated channel (such as a stand-alone dedicated control channel) or a shared channel (i.e. a TBF mapped onto an SBPSCH) is allocated.

A request message generator is provided to a mobile station at which to generate a request for allocation of the communication resources to effectuate a communication service. The request message generator generates a request for the allocation of the channel when a mobile-originated communication session is to be initiated. And, the message generator generates a request message when a mobile-terminated communication session is to be effectuated. The mobile station is alerted to the mobile-terminated communication session when a page is broadcast thereto. A network part of the packet radio communication system includes a response message generator that generates a response message responsive to the request message. The response message includes, if appropriate, allocation of a channel assignment.

In these and other aspects, therefore, apparatus, and an associated method, is provided for a packet radio communication system. The packet radio communication system permits communication of packet-formatted data between a network part and a mobile station. Assignation of a dedicated channel (e.g. stand-alone dedicated control channel) used pursuant to effectuation of a communication service in which the packet-formatted data is communicated is facilitated. A packet channel request message generator is selectably operable to generate a packet channel request message by way of a packet common control channel. The packet channel request message forms a request for the assignation thereto of a dedicate channel (e.g. a stand-alone dedicated control channel).

A more complete appreciation of the present invention and of the scope thereof can be obtained from the accompanying drawings that are briefly summarized below, the following descriptions of the presently-preferred embodiments of the invention, and the appended claims.

DETAILED DESCRIPTION

Figure 1:
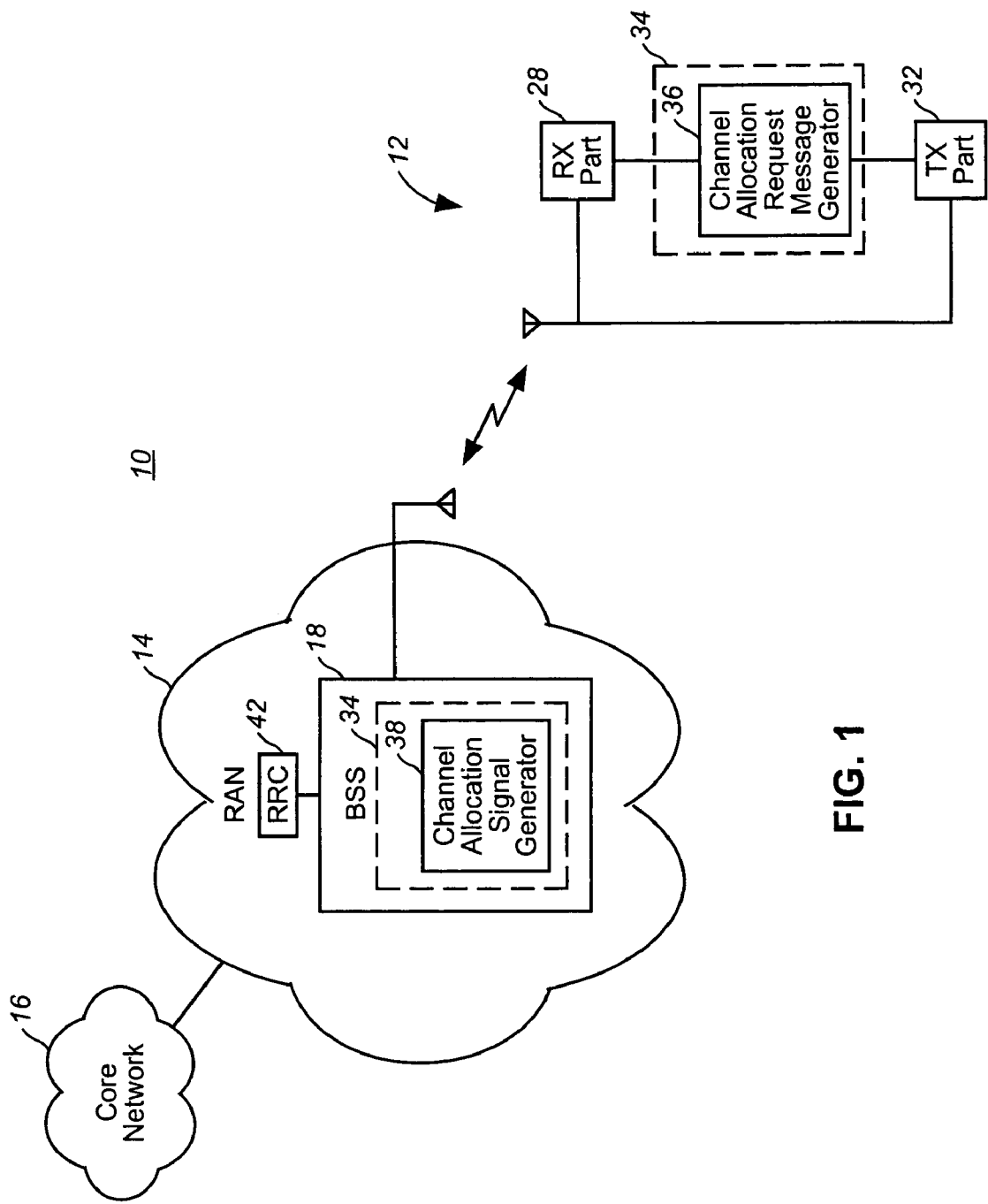
FIG. 1 illustrates a functional block diagram of a communication system in which an embodiment of the present invention forms a portion.

Referring first to FIG. 1, a communication system, shown generally at 10, operates to provide for radio communications of data with mobile stations, of which the mobile station 12 is exemplary. In the exemplary implementation, the communication system forms a cellular communication system operable generally pursuant to a GSM (Global System for Mobile communications) operational specification in which GPRS (General Packet Radio Service) is implemented. It should be noted at the outset, however, that while operation of an embodiment of the present invention shall be described with respect to its exemplary implementation in a GSM system, operation of other embodiments of the present invention are analogously operable in other communication systems.

The communication system further includes a network part, here shown to include a radio access network (RAN) 14 and a core network (CN) 16. The core network forms, for instance, a packet data network, and the radio access network is constructed, and is operable, generally pursuant to the aforementioned GSM standard that provides for GPRS.

The radio access network includes, amongst other things, base station systems (BSSs) of which the base station system 18 is representative. Communication of data to effectuate a communication service is performed by communicating the data upon communication channels defined upon radio links formed between the base station system 18 and the mobile station 12. Data is communicated on both various signaling and data channels by which to effectuate the communication of the data between the base station system and the mobile station.

Communication services that can be effectuated between the network part of the communication system and the mobile station are generally categorized as being either mobile-terminated communications or mobile-originated communications. When the communications are mobile-terminated, a communication session by which to effectuate the communication service is effectuated by a communication node other than the mobile station 12. And, when the communications are mobile-originated, the communication session pursuant to which the communication service is to be effectuated is originated at the mobile station 12.

The operational specification of the GSM system sets forth signaling protocols and device operational requirements of the devices of the communication system. For instance, operational modes of the mobile station are defined. Included amongst the operational modes are an Iu mode and a Ab/G mode. And, active and idle modes are defined for the mobile station.

Various channels are also defined pursuant to the GSM operational specifications. When the GSM system further provides for GPRS, additional signaling channels are defined. In the exemplary system in which the GSM system further provides for GPRS, both a CCCH (Common Control Channel) and a PCCCH (Packet Common Control Channel) are defined.

When a PCCCH is available, the mobile station camps on the PCCCH. If, while the mobile station is camped-on the PCCCH, and a page is broadcast to the mobile station, existing operation requires the mobile station to stop monitoring the PCCCH and, instead, go to the CCCH.

Once tuned to the CCCH, the mobile station requests, by way of a random access channel (RACH), allocation of a dedicated channel such as a stand-alone dedicated control channel (SDCCH). The dedicated channel (e.g. SDCCH) is thereafter assigned to the mobile station upon which to effectuate the communication service.

A mobile-originated communication session analogously also requires the mobile station to tune out of the PCCCH and to the CCCH prior to requesting allocation of the stand-alone dedicated control channel.

Such existing requirements that the mobile station tune out of the PCCCH and into the CCCH prior to requesting the allocation of the stand-alone dedicated control channel is unduly cumbersome, but also increases the risk of CCCH congestion and is hence time-consuming.

The mobile station 12 forms a radio transceiver having a receive part 28 and a transmit part 32. The mobile station is further shown to include apparatus 34 of an embodiment of the present invention. The apparatus 34 includes a channel allocation request message generator 36. The channel allocation request message generator is selectably operable to generate a channel allocation request message while the mobile station is camped-on the packet common control channel (PCCCH). Because the request message is generated, and sent, while the mobile station remains camped-on the PCCCH, the channel allocation is able to be granted more quickly, resulting in fewer delays in the effectuation of the communication service.

The base station system 18 also includes apparatus 34 of an embodiment of the present invention. The apparatus 34 is here shown to be positioned at the base station system to form a portion thereof. In other implementations, the apparatus can be positioned elsewhere at the network part of the communication system, or coupled thereto.

The network part of the apparatus 34 here operates, responsive to detection at the network of the channel allocation request message to generate a channel allocation message for communication to the mobile station to identify, therein, the channel allocation upon which to send the packet data to effectuate the packet communication service. The apparatus 34 includes a channel allocation signal generator 38 that generates the channel allocation message for communication to the mobile station. In Iu mode, the channel allocation signal message generator is coupled to a radio resource controller (RRC), and the RRC determines the channel allocation and provides indication thereof to the signal message generator. Once the channel is allocated, and the mobile station is notified of the channel allocation, effectuation of the communication service is permitted, and packet data is communicated to effectuate the communication service.

A packet channel request message generated by the message generator 36 enables the mobile station 12 to request, by way of a packet random access channel (PRACH), allocation of a dedicated channel (such as stand-alone dedicated control channel (SDCCH)) by which to communicate the packet data. That is, a dedicated channel request is sent within a packet channel request message communicated upon the PRACH. And, the channel allocation signal generator 38 generates a new message, a packet DBPSCH assignment message to assign the dedicated channel by way of a PCCCH (PAGCH). As a result, the mobile station, camped-on the PCCCH is able to request allocation of the dedicated channel without going to the CCCH. And, assignation of the dedicated channel is made by way of the PCCCH. The signaling is provided both for a mobile station operable in a GERAN ReI Iu mode as well as a possible enhancement to the GERAN A/Gb mode. Also, the apparatus 34 provides for the introduction of a signaling radio bearer access request on the PRACH. In this manner, a dedicated channel such as an SDCCH can be allocated as an answer to an SRB access request.

The following are exemplary formats, both an eleven-bit format and an eight-bit format by which to form the packet channel request pursuant to an embodiment of the present invention. In these formats, the SDCCH request is common to both the Iu mode and the A/Gb mode.

PACKET CHANNEL REQUEST (11 bits):

<Dedicated Channel Request: 101000 <RandomBits: bit (5)>>

PACKET CHANNEL REQUEST (8 bits)

<Dedicated Channel Request: 01101 <RandomBits: bit(3)>>

Alternately, in another format, the SDCCH requests different values depending upon whether the mobile station is in the Iu mode or the A/Gb mode. The alternate format is as follows:

PACKET CHANNEL REQUEST (11 bits):
 <Dedicated Channel Request Iu: 101000 <RandomBits: bit (5)>>
 <Dedicated Channel Request A/Gb: 101001 <RandomBits: bit (5)>>
PACKET CHANNEL REQUEST (8 bits):
 <Dedicated Channel Request Iu: 01101 <RandomBits: bit (3)>>
 <Dedicated Channel Request A/Gb: 01110 <RandomBits: bit (3)>>

Once the request message is communicated to the network part of the communication system, a packet DBPSCH assignment message is selectably generated and returned to the mobile station. The channel allocation signal message generator 38 generates an RLC/MAC control message that is sent on the PAGCH as an answer to the Dedicated Channel request (PRACH) or an SRB access request. The message is here designated as a packet DBPSCH assignment message. As allocation of resources on the DBPSCH is under control of the RRC 42, generation and communication of this message at the RLC/MAC is triggered responsive to operation of the RRC. And, the parameters required to allocate the dedicated channel are also provided by the RRC.

For instance, the message can be identified by Rel5 mobile stations 12 only. And, new uplink message-type is proposed as follows:

```
<MESSAGE TYPE : bit (6) = = 001001 > < PACKET DBPSCH
ASSIGNMENT message content>
The message, in one implementation, is encoded as follows:
        <PACKET SDCCH ASSIGNMENT message content>::=
            <PAGE MODE : bit(2)>
            { 0|1 < PERSISTENCE_LEVEL : bit(4)>*4}
            {{<Packet Request Reference:<Packet Request Reference IE>>}
                {0 --Message Escape
                    <CHANNEL_DESCRIPTION: <Channel Description IE>>
                            <padding bits>
                    !<Non-distribution part error: bit(*)=<no string>>}
                !<Message escape: {1} bit(*)=<no string>>}    --Extended for future use
                !<Address information part error: bit(*) = <no string>>}
            !<Distribution part error: bit (*) = <no string>>;
        < Channel Description IE > ::=
                < CHANNEL_TYPE : bit (3) >
                < TIMESLOT_ALLOCATION : bit (8) >
                < TSC : bit (3) > -- already described in 3GPP TS 44.060
                {0 < MAIO : bit (6) > -- already described in 3GPP TS 44.060
                    < HSN : bit (6) > -- already described in 3GPP TS 44.060
                |1 < ARFCN : bit (10) > };
PAGE_MODE (2 bit field)
This field is described in clause 12.20.
PERSISTENCE_LEVEL (4 bit field for each Radio Priority 1..4)
This field is defined in subclause 12.14, PRACH Control Parameters.
Packet Request Reference
This information element is defined in subclause 12.11.
CHANNEL_TYPE (3 bit field)
This field indicates the type of channel allocated to the mobile station.
Bit
3 2 1

0 0 0   SDCCH/4 + SACCH/C4
0 0 1   SDCCH/4
0 1 0   SDCCH/8 + SACCH/C8
0 1 1   SDCCH/8
1 0 0   TCH/F + SACCH/TF
1 0 1   TCH/H + SACCH/TH
1 1 0   PDTCH/F + SACCH/TF
1 1 1   Reserved for future use
TIMESLOT_NUMBER (3 bit field)
This field is the binary representation the timeslot number of the
allocated timeslot of the channel indicated in CHANNEL_TYPE.
<RRC_Container_IE:<RRC_Container_IE>>
<RRC_Container_IE>:: =
        {<Size : bit (7)> - - A bigger size could as well be considered
        <RRC_Container : bit(val(Size))>};
```

By distinguishing the Dedicated Channel requests in the different modes, the GERAN is able to detect, from the cause value that is received, whether the mobile station is making a A/Gb access or an Iu access. Note, however, that an EGPRS packet channel request message need not include any SDCCH requests. But, such a request can be later-introduced.

A signaling radio bearer access request, as noted above, can also be formed in the eleven-bit packet channel request on the packet random access channel (PRACH) to request allocation of a dedicated channel.

As the signaling radio bearer concept exists only in the Iu mode, the SRB access request is indicative of an Iu access. The packet DBPSCH assignment message generated by the signal message generator 38 is selectably generated responsive to the SRB access request.

In one implementation, as a reply to an SRB access request, the network part of the communication system allocates a dedicated channel (e.g. SDCCH) or a shared channel (i.e. a TBF on an SBPSCH). For example, if in a paging request, the network indicates that an SDCCH is required, the network, upon reception of the SRB access request from the mobile station, allocates the SDCCH.

Exemplary formatting of an SRB access request message generated pursuant to operation of an embodiment of the present invention is as follows:
PACKET CHANNEL REQUEST (11 bits):
<Predefined SRB Access: 101010 <RandomBits: bit(5)>>
PACKET CHANNEL REQUEST (8 bits):
<Predefined SRB Access: 01111 <RandomBits: bit(3)>>

Figure 2:
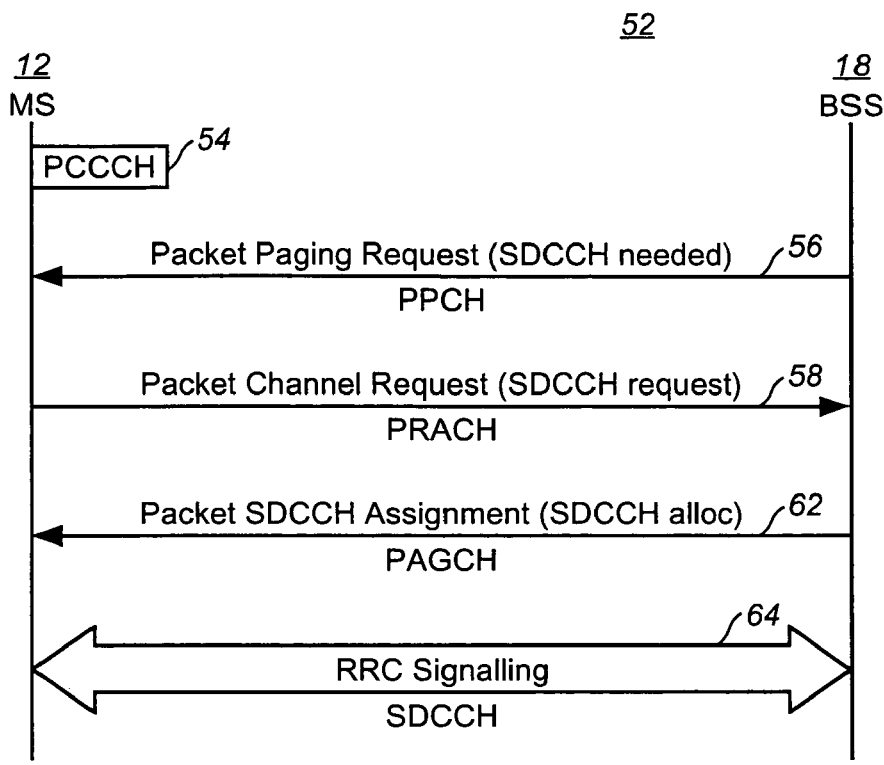
FIG. 2 illustrates a message sequence diagram representative of signaling generating during operation of an embodiment of the present invention.

FIG. 2 illustrates a message sequence diagram, shown generally at 52, representative of signaling generated during operation of an embodiment of the present invention between the parts of the apparatus 34 positioned at the mobile station 12 and at the base station system 18. Initially, and as indicated by the block 54, the mobile station is camped-on the PCCCH. A packet paging request, indicated by the segment 56, is generated upon the packet paging channel (PPCCH) as a packet paging request indicating that a dedicated channel (e.g. SDCCH) is required.

Responsive thereto, the request message generator 36 at the mobile station generates a packet channel request, indicated by the segment 58, on the packet random access channel (PRACH). And, upon delivery of the request to the network part of the communication system, communication resources are selectably allocated by the RRC 42. And, as indicated by the segment 62, the signal message generator 38 generates a packet DBPSCH assignment on the PAGCH. Thereafter, and as indicated by the segment 64, RRC signaling is effectuated on the assigned SDCCH.

Figure 3:
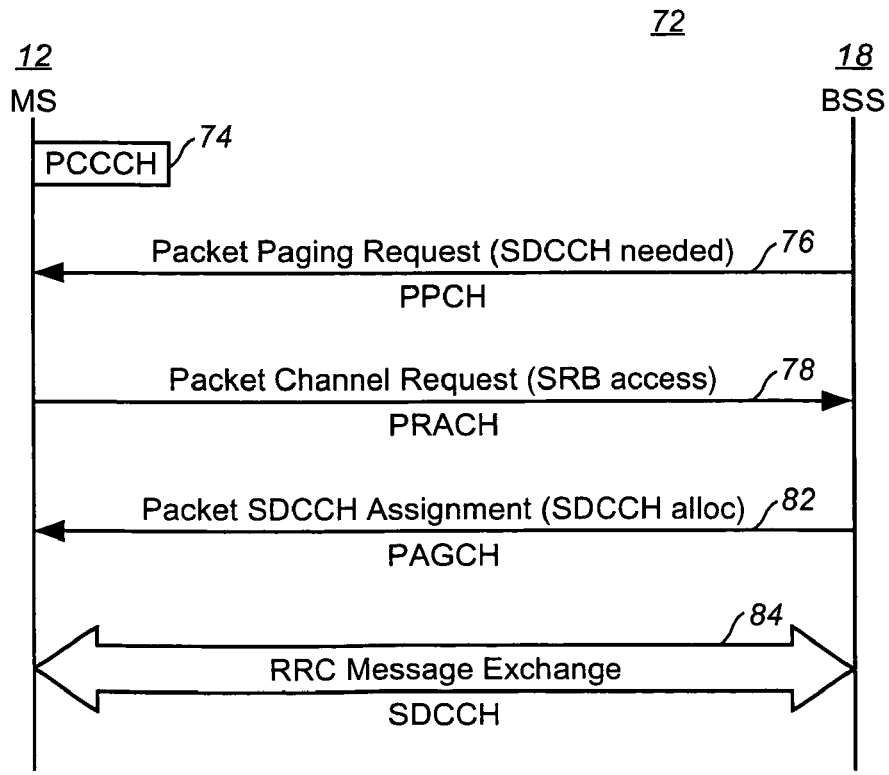
FIG. 3 illustrates a message sequence diagram, similar to that shown in FIG. 2, but here of signaling generated during alternate operation of an embodiment of the present invention.

FIG. 3 illustrates a message sequence diagram, shown generally at 72, representative also of signaling generated during operation of an embodiment of the present invention between the mobile station 12 and the base station system 18 pursuant to an embodiment of the present invention. Again, the mobile station remains camped-on the packet common control channel (PCCCH), indicated by the block 74. When a dedicated channel is required, a packet paging request is broadcast, indicated by the segment 76, upon the PPCH. Responsive thereto, the mobile station generates a packet channel request pursuant to an embodiment of the present invention, here an SRB access request, upon the packet random access channel (PRACH). The request is indicated by the segment 78.

Responsive thereto, the channel allocation signal message generator selectably operates to generate a packet DBPSCH assignment message, indicated by the segment 82, upon the PAGCH. Thereafter, and as indicated by the segment 84, RRC message exchange is effectuated upon the assigned SDCCH.

Review of the message sequence diagrams 52 and 72 of FIGS. 2 and 3 indicate that a mobile station, camped-on the PCCCH, is able to remain upon the PCCCH while generating a dedicated channel request or an SRB access request by way of the packet random access channel.

Figure 4:
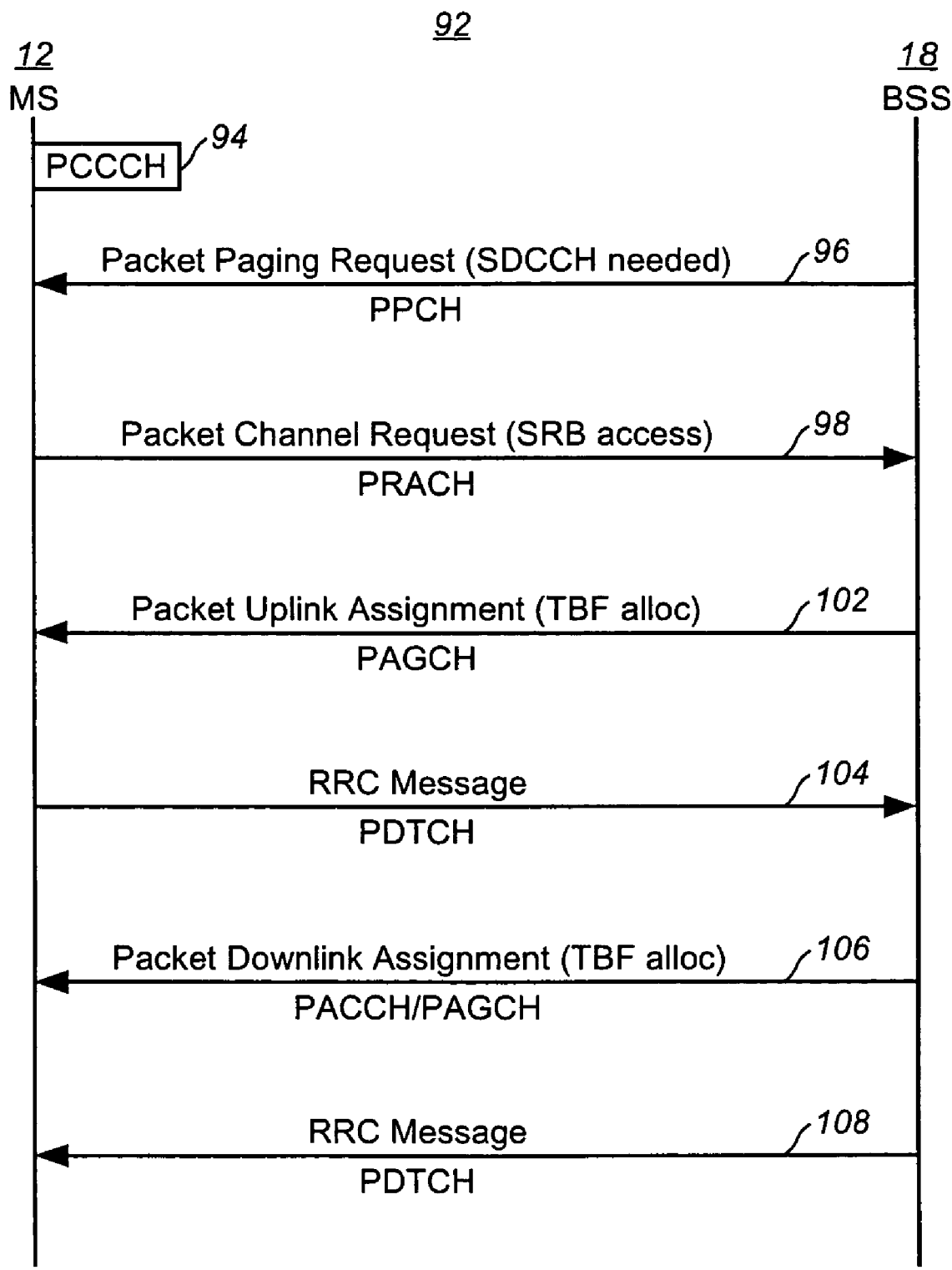
FIG. 4 illustrates another message sequence diagram, also representative of signaling generated during operation of an embodiment of the present invention.

FIG. 4 illustrates a message sequence diagram, shown generally at 92, also representative of operation of an embodiment of the present invention implemented in the communication system 10 shown in FIG. 1. Again, the mobile station camps-on the packet common control channel, here indicated at the block 94. A packet paging request, indicated by the segment 96, is generated by the base station system and communicated to the mobile station on the PPCH. Responsive thereto, a packet channel request, indicated by the segment 98, is generated by the mobile station and communicated back to the base station system.

Responsive thereto, a packet uplink assignment is generated to assign a shared channel, indicated by the segment 102. And, thereafter, as indicated by the segment 104, an RRC message is generated by the mobile station and communicated upon the PDTCH. Then, and as indicated by the segment 106, a packet downlink assignment is generated and, thereafter, an RRC message, indicated by the segment 108, is sent on the PDTCH.

Again, because the mobile station is able to generate the request while camped-on the PCCCH, the channel allocation is able to be more quickly granted.

The previous descriptions are of preferred examples for implementing the invention, and the scope of the invention should not necessarily be limited by this description. The scope of the present invention is defined by the following claims:

The invention claimed is:

1. Apparatus for a mobile station operable in a packet radio communication system camped-on a packet common control channel for facilitating assignation of a stand-alone dedicated control channel (SDCCH) used pursuant to effectuation of a communication service in which the packet-formatted data is communicated, wherein the packet radio communication system also utilizes a common control channel, said apparatus comprising:
   a packet channel request message generator selectably operable to generate a packet channel request message, while the mobile station remains camped-on the packet common control channel by way of the packet common control channel, instead of re-tuning to the common control channel, the packet channel request message forming a request tor the assignation thereto of the stand-alone dedicated control channel, the packet channel request message including an indication of a mode in which the mobile station is operated.

2. The apparatus of claim 1 wherein a packet random access channel (PRACH) is defined together with the packet common control channel and wherein the packet channel request message generated by said packet channel request message generator is generated upon the packet random access channel.

3. The apparatus of claim 2 wherein the packet radio communication system is operable generally pursuant to system protocols of a GSM (Global System for Mobile communications) that provides GPRS (General Packet Radio Service), the mobile station operable in an Iu-mode, wherein the packet channel request message generated by said packet channel request message generator is generated while the mobile station is operated in the Iu-mode, and wherein the indication of the mode in which the mobile station is operated comprises an indication that the mobile station is operated in the Iu-mode.

4. The apparatus of claim 3 wherein the packet radio communication system is operable generally pursuant to protocols of a GSM (Global System for Mobile communications) system that provides GPRS (General Packet Radio Service), the mobile station operable in an A/Gb mode, wherein the packet channel request message generated by said packet channel request message generator is generated while the mobile station is operated in the A/Gb mode and wherein the indication of the mode in which the mobile station is operated comprises an indication that the mobile station is operated in the A/Gb mode.

5. The apparatus of claim 4 wherein the packet channel request message is of first values when generated while the mobile station is operated in the Iu mode and is of second values when generated while the mobile station is operated in the A/Gb mode.

6. The apparatus of claim 4 wherein the packet channel request message generated by said packet channel request message generator is of a multi-bit length, containing request bits and other bits.

7. The apparatus of claim 6 wherein the request bits comprise a six-bit sequence.

8. The apparatus of claim 7 wherein the other bits comprise random value bits of a five-bit length.

9. The apparatus of claim 6 wherein the packet channel request message is of an eleven-bit length.

10. The apparatus of claim 6 wherein the request bits comprise a five-bit sequence.

11. The apparatus of claim 10 wherein the other bits comprise random-value bits of a three-bit length.

12. Apparatus for a network part of a packet radio communication system for selectably assigning a stand-alone dedicated control channel (SDCCH) to a mobile station to effectuate the communication service therein, wherein the nacket radio communication system utilizes a common control channel and a packet common control channel, said apparatus comprising:
  a packet, stand-alone dedicated control channel assignment message generator selectably operable responsive to detection at the network part of the packet radio communication system of a request for the stand-alone dedicated control channel assignment, the request formed of a packet channel request message that includes a mobile-station operating mode, the request, a mobile-station generated request sent on the packet common control channel while the mobile station remains camped on the packet common control channel instead of re-tuning to the common control channel, said packet, stand-alone dedicated control channel message generator for generating the stand-alone dedicated control channel message for communication to the mobile station.

13. The apparatus of claim 12 wherein the network part comprises a radio resource controller and wherein channel allocations contained in the stand-alone dedicated control channel assignment are made by the radio resource controller.

14. The apparatus of claim 13 wherein the packet radio communication system defines a PAGCH (Packet Access Grant Channel) and wherein the stand-alone dedicated control channel message is transmitted upon the PAUCH.

15. The apparatus of claim 13 wherein the request for the stand-alone dedicated control channel assignment responsive to which said packet, stand-alone dedicated control channel is selectably operable comprises a Signaling Radio Bearer Access Request generated upon a Packet Radio Random Access Channel.

16. A method for communicating in a packet radio communication system permitting communication of packet-formatted data by a mobile station pursuant to communication service, said method for facilitating assignation of a stand-alone dedicated control channel used pursuant to effectuation of a communication service in which the packet-formatted data is communicated, wherein the packet radio communication system utilizes a common control channel and a nacket common control channel, said method comprising:
  selectably generating a packet channel request message at a mobile station while the mobile station is camped on a packet common control channel, instead of re-tuning to the common control channel, for communication by way of the packet common control channel to request the assignation of the stand-alone dedicated control channel to effectuate the communication service, the packet channel request including an indication of a mode in which the mobile station is operated; and
  sending the packet channel request message while the mobile station remains camped on the packet common control channel.

17. The method of claim 16 further comprising the operations of
  detecting the packet channel request message generated upon the packet common control channel upon delivery to a network part of the packet radio communication system; and
  selectably generating a stand-alone dedicated control channel message for communication to the mobile station.

18. The method of claim 17 wherein the network part comprises a radio resource controller and wherein the stand-alone dedicated control channel message is of values determined by the radio resource controller.

19. The method of claim 16 wherein the packet channel request message is of an eleven-bit length.

20. The method of claim 16 wherein the packet channel request message is of an eight-bit length.

* * * * *